United States Patent [19]
Deman

[11] 4,263,672
[45] Apr. 21, 1981

[54] APPARATUS FOR SYNCHRONIZATION ON THE BASIS OF A RECEIVED DIGITAL SIGNAL

[75] Inventor: Pierre Deman, Paris, France

[73] Assignee: Thomson-CSF, Paris, France

[21] Appl. No.: 49,127

[22] Filed: Jun. 18, 1979

[30] Foreign Application Priority Data

Jun. 20, 1978 [FR] France ............................. 78 18406

[51] Int. Cl.³ .............................................. H04L 7/00
[52] U.S. Cl. .................................................. 375/111
[58] Field of Search .............. 375/106, 108, 109, 110, 375/111, 112, 113, 114, 115, 116, 117, 118; 328/155

[56] References Cited

U.S. PATENT DOCUMENTS

| | | | |
|---|---|---|---|
| 3,629,503 | 12/1971 | Rempert | 375/111 |
| 3,908,084 | 9/1975 | Wiley | 375/117 |

FOREIGN PATENT DOCUMENTS

1426996 12/1965 France .

Primary Examiner—Thomas A. Robinson
Attorney, Agent, or Firm—Roland Plottel

[57] ABSTRACT

An apparatus for synchronization in digital transmission makes it possible to control a clock circuit on the basis of the timing of a digital message having indexing bits followed by information bits. For this purpose it contains a control system, including a clock circuit, with an input connected either to the input or the output of a delay line by means of a switching system. The phase control begins with the first indexing bit received at the input of the delay line. When this control is established the input of the control system is connected to the output of the delay line. This connection brings the clock into operation on the basis of the control established and then sets off a "follow-up" operation as soon as the first indexing bit reaches the output of the delay line.

4 Claims, 3 Drawing Figures

FIG_1

APPARATUS FOR SYNCHRONIZATION ON THE BASIS OF A RECEIVED DIGITAL SIGNAL

BACKGROUND OF THE INVENTION

1. Field of the Invention

The invention relates generally to digital transmission systems and particularly to ones that control a clock on the basis of the timing of a received digital message in order to be able to demodulate the message.

2. Description of the Prior Art

In digital transmissions the recurrence frequency of the received information is known, but not the phase. The phase is partly a function of the phase at the origin of each binary element (called a bit herein) and depends partly on the conditions of propagation. To demodulate the digital message received, a clock whose phase is controlled by the timing of the received digital message is required. This control must take place when the beginning of the message (the message being made up of indexing bits followed by information bits) arrives. It should be noted that the indexing bits serve to determine the first information bit. The message is preceded by a signal, called a "roll", containing logical sequences of "0" and "1".

The drawback of this procedure relates to short and repetitive messages in which the time allocated to the indexing bits correspondingly reduces the time available for the transmission of information bits.

The purpose of the present invention is to eliminate this drawback.

One type of prior art synchronization apparatus is shown and described in French Pat. No. 1,426,996 which is made part of the present application.

SUMMARY OF THE INVENTION

According to the invention there is provided an apparatus for synchronization in digital transmission on the basis of a received digital message. The apparatus includes a delay line with an input for receiving the digital message and an output. The digital message is made up of indexing bits followed by information bits and is subject to strong disturbance by noise. A control system in the apparatus has an input, a clock circuit, and means for regulating the clock circuit in accordance with the timing of the message received. A switching system links the input of the control system to either the input or the output of the delay line. A control circuit for the switching system is coupled to the control system, for enabling the means to control the phase of the clock circuit first on the basis of the indexing bits received at the input of the delay line and then on the basis of the digital message bits supplied by the output of the delay line.

BRIEF DESCRIPTION OF THE DRAWINGS

The invention and its other characteristics will be better understood from the description and accompanying drawings in which.

The corresponding elements in the three Figures are designated by the same legends.

DETAILED DESCRIPTION

Figure 1:
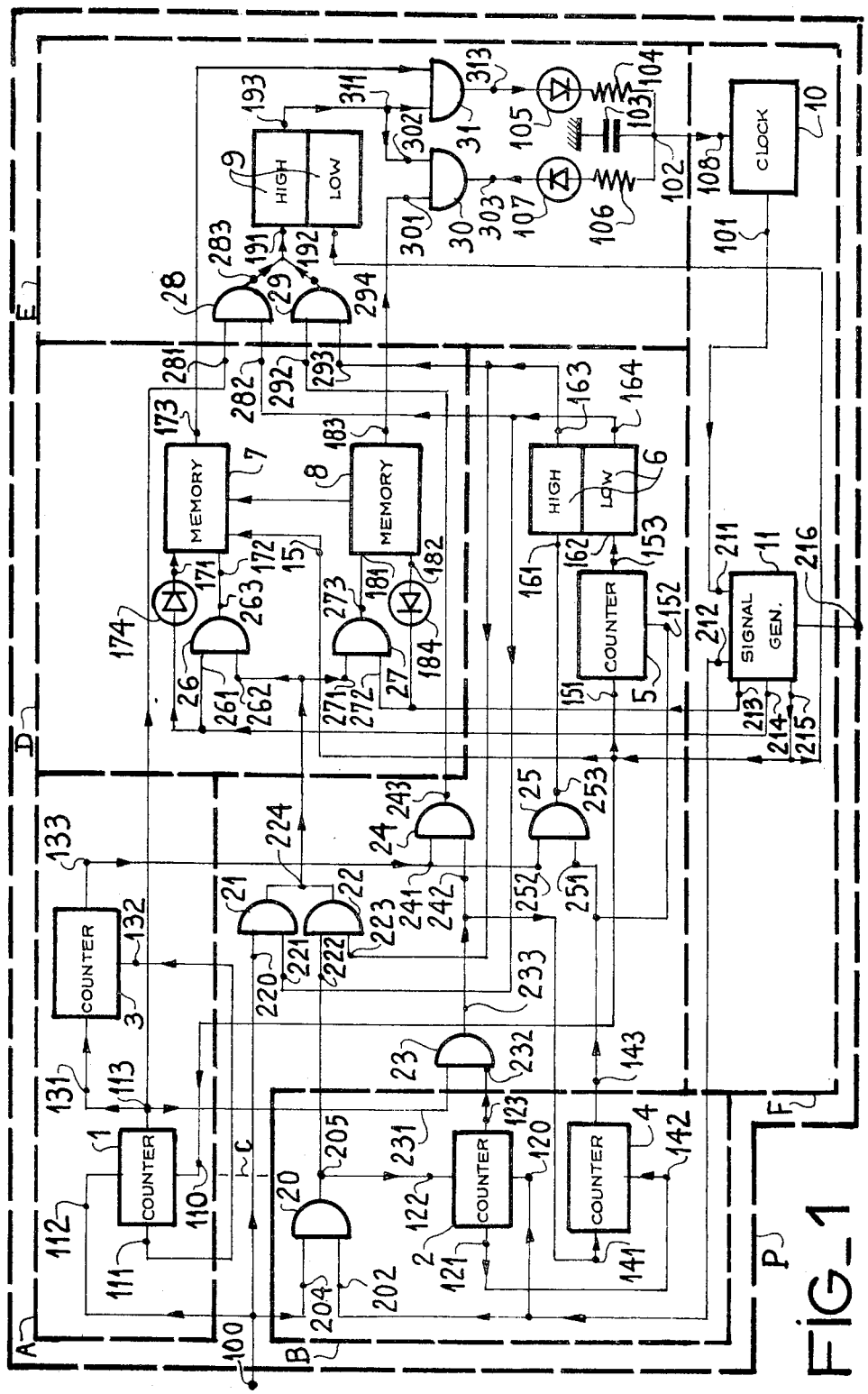
FIG. 1 is a block diagram of a modification of the synchronization apparatus shown in the cited French patent No. 1 426 996.

In FIG. 1, an input 100 of an assembly P is designed to receive pulses coming from an apparatus (not shown). These pulses are obtained by differentiation of a digital message. Assembly P has six main sub-assemblies designated A, B, C, D, E, F.

These sub-assemblies A, B, C, D, E, F can be described generally as performing the following functions. Sub-assembly A provides an approximate verification of the frequency of recurrence of the signal entering input gate 100. Sub-assembly B provides an exact verification of the frequency of recurrence, and phase shift of this signal with respect to a signal delivered by a generator. Sub-assembly C selects pulses of the input signal entering at 100. Sub-assembly D stores the above pulses and generates two signals characteristic of the advance and delay of these pulses with respect to the signal delivered by the above-mentioned generator. Sub-assembly E governs the frequency of a clock 10, and sub-assembly F generates periodic signals.

Sub-assembly A has two electronic counters 1 and 3.

Sub-assembly B has two electronic counters 2 and 4 and an AND gate 20.

Sub-assembly C has five AND gates 21, 22, 23, 24, and 25; an electronic counter 5 and a bistable multivibrator circuit 6. AND gate 20 is part of both sub-assembly B and sub-assembly C.

Sub-assembly D has two AND gates 26 and 27; two memory circuits 7 and 8, and two diodes 174 and 184.

Sub-assembly E has four AND gates 28, 29, 30 and 31, a bistable multivibrator circuit 9, two diodes 105, and 107, two resistors 104 and 106; and a capacitor 103.

Sub-assembly F has a clock 10, and a periodic signals generator 11 providing a time base.

The periodic signals delivered at outputs 212, 213, 214, 215 and 216 of the generator 11 determine almost entirely the operation of assembly P. These signals will therefore be defined first. On output terminal 215 (see FIG. 2, waveform 41) is a periodic signal, called "primary", of short pulses defining and delimiting by their recurrence a base period T. On output terminal 213 (see FIG. 2, waveform 42) is a signal, called "secondary", rectangular wave form, whose leading edges coincide in time with those of the primary signal. On output terminal 214 is a signal (see FIG. 2, waveform 43), called "tertiary", of rectangular waveform, having the same frequency as the preceding signal, but phase shifted 180 degrees. On output terminal 212 is a signal (see FIG. 2, waveform 44), called "quaternary", rectangular and dissymmetric in waveform, having a frequency equal to that of the "primary" signal, and whose positive alternations are shorter than its negative alternations, and whose positive alternations coincide at their center with the leading edge of the tertiary signal. On output terminal 216 is a fifth signal identical to the primary signal, but phased shifted 180 degrees.

Counter 1 counts the number of pulses received per base signal (coming from terminal 215 of generator 11) on terminal 110. This counter is constructed so that if the signal 100 received corresponds to the verification criteria for the recurrence frequency of said signal (e.g. a single pulse per base period) it transmits a pulse to output terminal 113 at the end of each period. If the signal received does not correspond to these criteria (e.g. if the number of pulses of the signal 100 in a given time defined by the base period is greater than 1) it transmits a pulse at the end of the corresponding period to output terminal 111.

Counter 3 counts the number of successive base periods for which the criterion verified by counter 1 has been satisfied. The pulses to be counted coming from terminal 113 are transmitted to input 131. This counter is returned to zero by every pulse coming from output terminal 111 and transmitted to terminal 132. When counter 3 has counted a given number n of successive correct pulses (during a period in which either correct pulses are present or there is a total absence of pulses), for example 4, it remains in "full" position and causes the opening of gates 24 and 25 by means of its output signal applied to its output 133.

Counter 2 is similar to counter 1 except that it carries out verification during a time interval shorter than the base period, this time interval being for example equal to T/4 and centered in the middle of base period T; the duration of this time interval is related to the value of the noise level above which the control is intended not to operate. By increasing the duration of this time interval, the level of noise permitting control is raised, but the probability of incorrect control through an erratic signal is also increased. This time interval is determined by a signal supplied by generator 11 at output gate 212 and sent to the return to zero terminal 120 of counter 2.

The signal coming from input gate 100 after passing through gate 20, which is open during the period of exact verification, enters counter 2 through terminal 122. Gate 20 is opened by the signal coming from output 212.

Counter 4 is similar to counter 3. It counts the exactly correct pulses at its terminal 141, leaving output 123 of counter 2. These pulses cross gate 23 which checks the coincidence of the two verifications. Counter 4 is returned to zero by the defective control pulse coming from terminal 121 to terminal 142.

When counter 4 has counted a given number p of successive pulses, the signal coming from 143 partially opens AND gate 25 which, if the coincidence with the output signal of counter 3 is established, governs the switching of bistable 6, to its high position.

To simplify this explanation, the two states of a bistable multivibrator will be designated respectively as high position and low position, like those of all the multivibrators shown in FIG. 1. Similarly, a bistable multivibrator will be designated simply as a bistable.

Counter 5 is permanently fed by the signal leaving at gate 215 of generator 11 and reaching input terminal 151.

If no pulse enters from 143 of counter 4 by the return to zero terminal 152 during a number of periods equal to the counting capacity of counter 5 the latter becomes saturated and governs the return of bistable 6 to low position. In low position, bistable 6 partially opens gates 21 and 28; 21 receiving the input signal 100; and 28, receiving the correct pulses from counter 1. It also closes gates 22 (receiving the output pulses from gate 20), and 29 (receiving the output impulses from a gate 24, which receives at its two inputs the output pulses from counter 3 and from gate 23 respectively). In high position, bistable 6 opens gates 22 and 29 and closes gates 21 and 28.

The counting capacity of counter 5 is greater than that of counters 3 and 4, for example 256 or 512 pulses.

The assembly formed by gates 26 and 27, controlled respectively by the signals on outputs 214 and 213 coming from generator 11, directs the pulses of the signal coming from gate 21 or gate 22 toward one of the two memory circuits 7 and 8. Memory circuit 8 delivers at its output 183 a rectangular negative pulse whose leading edge is formed by any pulse entering at input 181 delayed at about 1.25 T and whose trailing edge is formed by the trailing edge of the secondary signal entering, through diode 184 preceded by a differentiating circuit (not shown), at input 182 and with the same delay.

Memory circuit 7 delivers at its output 173 a positive rectangular impulse whose leading edge is formed by the leading edge, retarded to about 0.75 T, of the tertiary signal entering, through diode 174 preceded by a differentiating circuit (not shown), at input 171 and whose trailing edge is formed by any impulse entering at input 172, with the same delay.

If the pulse of the signal coming from either gate 21 or gate 22 occurs during the first half of a base period T, a negative pulse at 183 is thus produced. If this pulse of the signal occurs during the second half of the period T, a positive pulse is produced at 173. The duration of these pulses is proportional to the variation of the signal pulse from the center of the base period considered. Taking into account the delays created by memory circuits 7 and 8, one of these two signals is available at approximately the center of the following base period.

When, at the end of the base period considered, the verifications have been carried out and are positive, a pulse leaves output 113 and crosses gate 28 if bistable 6 is in low position; if bistable 6 is in high position a pulse leaves gate 24 and crosses gate 29. One of these two pulses tips bistable 9 which causes the opening of gates 30 and 31 respectively receiving the output pulses of memory circuits 8 and 7.

During the base period immediately following and depending on whether the input signal pulse coincides in timing with a positive alternation corresponding to the secondary signal or a positive alternation corresponding to the tertiary signal mentioned above, integration capacitor 103 is either charged by the signal coming from 183 or discharged by the signal coming from 173. In one case the signal, delivered at terminal 173, traverses gate 31, diode 105 and load resister 104. In the other case the signal from 183, traverses gate 30, diode 107 and load resister 106.

Capacitor 103 integrates the signals respectively at 173 and 183, and the resulting error voltage, delivered at terminal 102, acts on the frequency of clock 10, by a known means, for example a variable reactance. When this voltage decreases there is a corresponding increase in the frequency of clock 10.

Clock 10 is thus phase controlled by the pulses received; and an error signal is only transmitted to the control system for the clock frequency if the checks carried out during the base period considered are satisfactory.

When one or several successive checks indicate an error with bistable 6 in high position, bistable 9 remains in low position, since it is returned to this position at the end of each base period by the signal coming from 215 of generator 11 entering input 192. Gates 30 and 31 remain closed, and bistable 6 remains in its high position until counter 5 is saturated.

The frequency of clock 10 remains constant, the voltage at the terminals of capacitor 103 remaining at the value fixed at the end of the control period. When counter 5 is saturated bistable 6 is flipped into low position and the phase control is again carried out with an approximate check.

Figure 2:
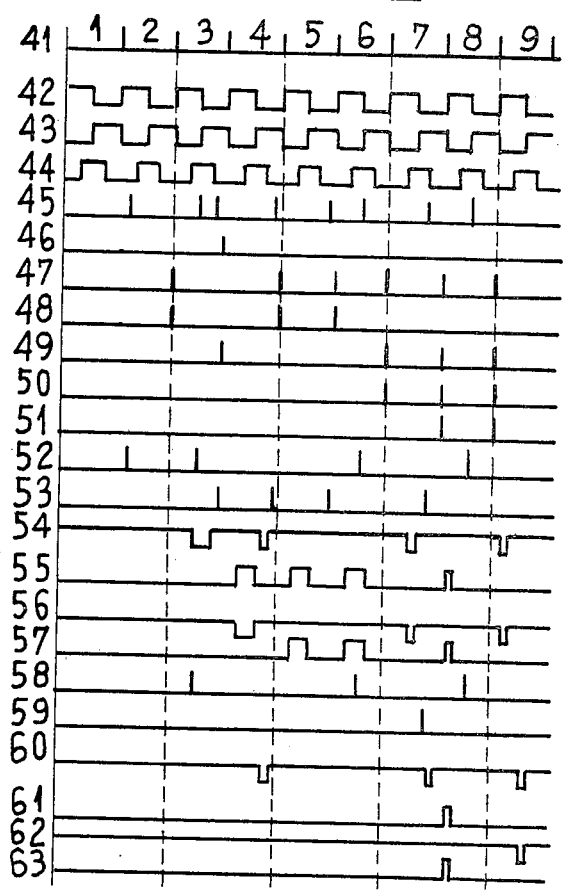
FIG. 2 shows waveform diagrams (voltage-time) of the control signals regulating the operation of the apparatus in FIG. 1.

FIG. 2 shows voltage or current waveforms at different points of the synchronization apparatus of FIG. 1.

A "roll" is shown in the Figure providing a transition by base period when the signal received is of good quality.

Line 41 represents the primary time base signal at point 215.

Line 42 represents the secondary signal at point 213.
Line 43 represents the tertiary signal at point 214.
Line 44 represents the quaternary signal at point 212.
Line 45 represents the input signal at point 100.
Line 46 represents the approximate verification signal (bad) at point 111.
Line 47 represents the approximate verification signal (correct) at point 113.
Line 48 represents the exact verification signal (bad) at point 121.
Line 49 represents the exact verification signal (correct) at point 123.
Line 50 represents the exact verification signal at point 233.
Line 51 represents the exact verification signal at point 243.

Lines 52 to 57 correspond to bistable 6 in low position.
Line 52 represents the signal at point 181.
Line 53 represents the signal at point 172.
Line 54 represents the signal at point 183.
Line 55 represents the signal at point 173.
Line 56 represents the signal at point 303.
Line 57 represents the signal at point 313.

Lines 58 to 63 correspond to bistable 6 in high position.
Line 58 represents the signal at point 181.
Line 59 represents the signal at point 182.
Line 60 represents the signal at point 183.
Line 61 represents the signal at point 173.
Line 62 represents the signal at point 303.
Line 63 represents the signal at point 313.

With bistable 6 in low position only periods 1 and 3 are considered bad and no control signal is transmitted to the clock during period 2 and 4.

With bistable 6 in high position, period 3 is considered bad in spite of the pulse at 123, the second pulse of this period having been detected by the approximate verification.

Moreover, no control signal is sent to the clock during periods 5, 6 and 7 unless gate 24 is opened by the counting of four correct periods (n=4) in the approximate verification by counter 3.

The description of the modified previous design given above with the help of FIGS. 1 and 2 is necessary for the understanding of the invention, which consists of assembly P of FIG. 1 and which will be described with the help of the following Figure.

Figure 3:
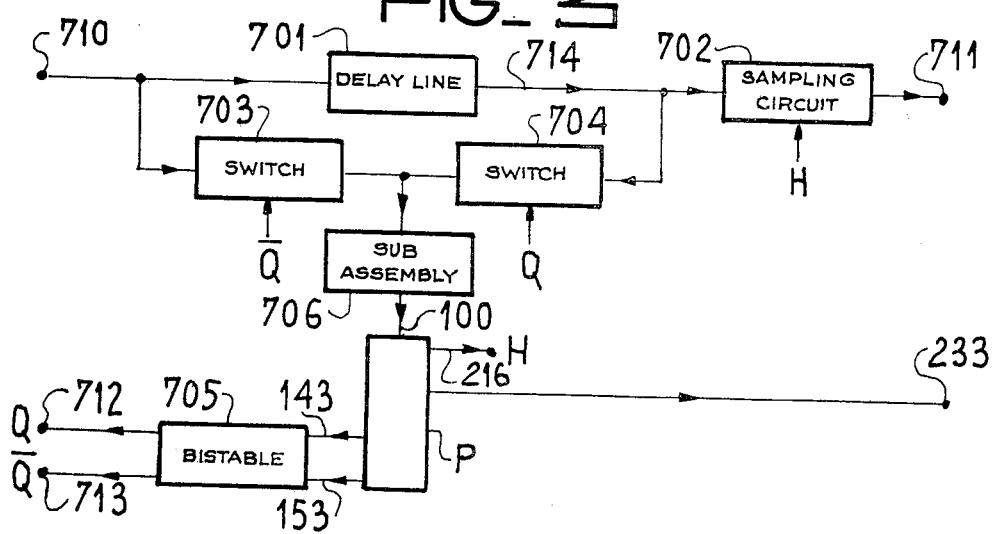
FIG. 3 is a block diagram of a circuit in accordance with the invention.

In FIG. 3 an input 710 receiving a digital message feeds, in parallel, a delay line 701 (e.g. one with a charge transfer apparatus) in series with a sampling circuit 702 whose output 711 constitutes a first output of the apparatus, and input 100 of assembly P of FIG. 1 through an electronic switch 703, controlled by a signal Q arranged in series with a sub-assembly 706. Output 714 of delay line 701 is connected to input 100 of assembly P, through an electronic switch 704 controlled by a signal $\bar{Q}$, arranged in series with sub-assembly 706. Sub-assembly 706 makes it possible to differentiate the transitions between the logic levels of the digital message. Signals Q and $\bar{Q}$ are supplied respectively by the direct output 712 and reverse output 713 of a bistable 705 having two inputs connected respectively to 143, the output of counter 4, and to 153, the output of counter 5, of assembly P.

Output 233 of AND gate 23 of assembly P constitutes a second output of the apparatus and output 216 of signal generator 11 of assembly P is connected to the control input of sampling circuit 702 (shown by legend H). In this design, input 152 of counter 5 is connected to output 143 of counter 4. The return to zero of counter 5 therefore takes place only after p correct pulses counted in counter 4. The operation of this apparatus is as follows.

The apparatus of the invention makes it possible to receive a digital message not made up of successive transitions preceding the indexing bits. Consequently the phase control of clock 10 of assembly P (FIG. 1) must be carried out chiefly with the indexing bits received at the input of delay line 701, so that the clock is controlled when the first indexing bit is supplied by the output of delay line 701.

This control is established by connecting input 100 of assembly P to the input of delay line 701 during a time period $\theta_2$ shorter than the delay $\theta_1 = q \cdot T$ (with q a whole positive number and T the timing period of the digital message) of the line (establishing control of the clock phase) then connecting this input 100 to the output of delay line 701 as soon as this control is established.

During the time period $\theta_3 = \theta_1 - \theta_2$, when input 100 is receiving no signals, the clock functions "free running" on the last phase correction received. If this time period $\theta_3$ is shorter than the counting time $\theta_4$ of counter 5, as is assumed in this set-up, the clock is still controlled by the last phase correction received and the control can be resumed as soon as the first indexing bit is delivered to the output of delay line 701.

The connection of input 100 is made by electronic switches 703 and 704 in the following way.

Bistable 705 is set at state "1" (Q=1 and $\bar{Q}$=0) when the logic signals supplied at 143 and 153 of assembly P are respectively at state "1" and "0". In the contrary case, with output 143 at state "0" and output 153 at state "1", the bistable is set at state "0" (Q=0 and $\bar{Q}$=1). When bistable 705 is at state "1" electronic switches 704 and 703 are respectively closed and open, and thus permit the output signals of delay line 701 to control the clock of assembly P. In the contrary case (bistable 705 at state "0") switches 704 and 703 are respectively open and closed, and thus enable the input signals of delay line 701 to control the clock of assembly P.

It should be noted that output 143 is at state "1" when p successive correct pulses have been recorded in counter 4 (FIG. 1), and at state "0" in the contrary case. Similarly, output 153 is at state "1" when counter 5 has reached its maximum count.

When the indexing bits of a digital message are received by input 710, assembly P having previously received only noise, output 143 is at state "0" (no correct pulses p) and output 153 at state "1" (no return to zero because counter 4 is not saturated). Bistable 705 is therefore at state "0" (Q=0 and $\bar{Q}$=1) and switches 703 and 704 are respectively closed and open. Control of the clock phase therefore begins from the first transition relating to the first indexing bit in the manner described above (FIG. 1). This period of control will be called the "acquisition period". When the signal of output 143 of assembly P moves to state "1" (p correct pulses) the signal of output 153 moves to state "0" (since the counter is returned to zero by output 152 which has changed state). Consequently bistable 705 is moved to state "1" and input 100 of assembly P is linked to output 714 of delay line 701. As soon as input 100 is connected to output 714 of delay 701, output 143 of counter 4 moves to state "0" since input 100 receives no further information during the time period $\theta_3$ which follows this connection. The clock phase remains that obtained at the end of the "aquisition"; this time period $\theta_3$ corresponds to the "free running" operation of the clock. If output 153 of counter 5 (of FIG. 1) has not changed state, or if the time period $\theta_3$ is shorter than the counting time $\theta_4$ (from 0 to the full scale) of counter 5 as is the case in the present set-up, outputs 143 and 153 are at state "0", which is a state of maintenance of the bistable at the preceding state, and input 100 of assembly P remains connected to output 714 of delay line 701.

When the message reaches output 714 of delay line 701, the verification of phase control again takes place as before. It is then a "follow-up" operation because the clock phase follows the digital message phase.

If the time period $\theta_3$ were longer than the counting time $\theta_4$ of counter 5, the change of state of the signal of output 153 would connect input 100 of assembly P with the input of delay line 701, and the message could not be demodulated. This possibility is excluded in the present set-up.

If, during the "follow-up" operation, noise disturbs the message, the signal of output 143 moves to state "0" (because of non-saturation of counter 4) and counter 5 counts the pulses received at its input 151 and if it is not returned to zero before the end of the count the signal of output 153 of this counter moves to state "1"; consequently input 100 of assembly P is connected to the input of delay line 701 for further "acquisition" operation.

It should be noted that after the arrival of the last message bit at input 100 (the "follow-up" operation), the clock operates "running free" during the counting period of counter 5. This permits maintenance of the control and the connection of input 100 to output 714 of delay line 701 during a time period $\theta_4$ after the arrival of this last bit at input 100, when the possibility exists of receiving a second message separated from the first by a time interval $\theta_5$ smaller than $\theta_4$ without a new acquisition phase.

Delay line 701 is made, for example, of a shift register, with a charge transfer device, delaying the information received at its input by a time period $\theta_1 = q \cdot T$ with q a whole positive number and T the timing period of the digital message, and such that $\theta_1$ is at least equal to the time period pT of counting of p pulses by counter 4 of FIG. 1. In one embodiment p and q are equal respectively to 8 and 12. In addition the digital message bits are sampled by an input apparatus (not shown but known for this type of delay line) of the delay line at a multiple frequency of the bit frequency $f = mF = m/T$ with $m = 10$ in the present case.

Sampling circuit 702 governed by the controlled clock signal makes it possible to reconstitute the sampled digital message (restoration of the digital message) and to supply it at output 711 where it will be demodulated.

The invention is not limited to the details described and shown; the apparatus can be modified in various ways, among which the following may be noted:

The clock is an oscillator operating at a frequency nominally identical to the bit frequency, the signal supplied by this oscillator is divided (in frequency) in a divide register and the phase corrections are made by suppression or addition of a pulse at the level of this divide register. This divide register delivers a signal governed in phase by the bit frequency which controls sampler 702.

It may be noted that such an apparatus can be used, inter alia, in digital transmission systems.

I claim:

1. Apparatus for synchronization in digital transmission on the basis of a received digital message, comprising: a delay line with an input for receiving the digital message and an output, the digital message being made up of indexing bits followed by information bits and being subject to strong disturbance by noise; a control system having an input, a clock circuit and means for regulating the clock circuit by the timing of the message received; a switching system for linking the input of the control system to either the input or the output of the delay line; and a control circuit for controlling the switching system, said control circuit being coupled to the control system, for enabling said clock circuit regulating means to control the phase of the clock circuit first on the basis of the indexing bits received at the input of the delay line and then on the basis of the digital message bits supplied by the output of the delay line.

2. Apparatus as claimed in claim 1 further comprising a sampling circuit having an input coupled to the output of the delay line, a control input and an output for restoring the digital message; and wherein said delay line is a shift register with a charge transfer device, said delay line having a delay of $\theta_1 = q \cdot T$ where q is a positive whole number greater than 0 and T is the timing period of the digital message and a base control frequency of $F_b = mF$ where m is a positive whole number greater than 1, and where $F = 1/T$; and wherein said control system has a first output coupled to the control input of the sampling circuit.

3. Apparatus as claimed in claim 1 wherein the switching system comprises a first and a second electronic switch, each of which has a control input, a signal input and an output, the signal input of said first switch being coupled to the input of said delay line, the signal input of said second switch being coupled to the output of said delay line, and the outputs of said first and second switches being coupled to the input of said control system.

4. Apparatus as claimed in claim 3, wherein the control system has a second and a third output, and wherein said control circuit comprises a bistable circuit having a first and a second input coupled respectively to the second and third outputs of said control system, and a direct and a reverse output coupled respectively to the control inputs of said second and first electronic switches.

\* \* \* \* \*